United States Patent
Perrelli

(10) Patent No.: US 12,018,768 B2
(45) Date of Patent: Jun. 25, 2024

(54) DUAL RANGE POSITION SENSING CONFIGURATIONS FOR VARIABLE DIFFERENTIAL TRANSFORMERS

(71) Applicant: Hamilton Sundstrand Corporation, Charlotte, NC (US)

(72) Inventor: Frank Perrelli, Charlotte, NC (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 173 days.

(21) Appl. No.: 17/554,951

(22) Filed: Dec. 17, 2021

(65) Prior Publication Data

US 2023/0194014 A1  Jun. 22, 2023

(51) Int. Cl.
*F16K 37/00* (2006.01)
*F16K 31/06* (2006.01)
*H01F 27/28* (2006.01)
*H01F 29/08* (2006.01)

(52) U.S. Cl.
CPC ...... *F16K 31/0679* (2013.01); *F16K 37/0041* (2013.01); *H01F 27/28* (2013.01); *H01F 29/08* (2013.01)

(58) Field of Classification Search
CPC ......... Y10T 137/8242; Y10T 137/8671; Y10T 137/87209; F16K 3/26; F16K 31/0679; F16K 31/363; F16K 31/383; F16K 37/083; F16K 37/0041; F15B 13/0402; H01F 27/28; H01F 28/08; G01D 5/2291
See application file for complete search history.

(56) References Cited

U.S. PATENT DOCUMENTS

| 3,173,003 A | * | 3/1965 | Muller-Girard | G01F 1/50 |
| | | | | 702/45 |
| 3,488,578 A | | 1/1970 | Stigmark | |
| 4,567,813 A | * | 2/1986 | Garnjost | F15B 18/00 |
| | | | | 91/509 |
| 5,412,317 A | | 5/1995 | Kyoizumi | |

(Continued)

FOREIGN PATENT DOCUMENTS

| GB | 2260821 A | 4/1993 |
| JP | 66049404 U | 4/1985 |

(Continued)

OTHER PUBLICATIONS

Extended European Search Report dated May 19, 2023, issued during the prosecution of European Patent Application No. EP 22211497.7.

*Primary Examiner* — Matthew W Jellett
(74) *Attorney, Agent, or Firm* — Kinney & Lange, P.A.

(57) ABSTRACT

An assembly includes a housing. A first set of coils is mounted to the housing. The first set of coils extends in an axial or rotational direction along the housing for a first length. A second set of coils is mounted to the housing. The second set of coils extends in the axial or rotational direction along the housing for a second length that is shorter than the first length. A core member includes a first core and a second core in series with one another in an axial direction along the core member. The core member is moveable within the housing along a stroke. For at least a first portion of the stroke, the first core is within the first set of coils. For at least a second portion of the stroke, the second core is within the second set of coils.

19 Claims, 4 Drawing Sheets

(56) References Cited

U.S. PATENT DOCUMENTS

| | | |
|---|---|---|
| 8,264,315 B2 | 9/2012 | Fox et al. |
| 8,757,196 B2 * | 6/2014 | Eriksson ................ F16K 17/04 |
| | | 137/554 |
| 9,863,787 B2 | 1/2018 | Hubbell |
| 10,641,597 B2 | 5/2020 | Roberts et al. |
| 10,655,753 B2 * | 5/2020 | Philips ................ F16K 31/426 |
| 2005/0000580 A1 * | 1/2005 | Tranovich ........... F16K 37/0041 |
| | | 137/625.65 |
| 2010/0090144 A1 | 4/2010 | Brandt, Jr. |
| 2012/0326824 A1 | 12/2012 | Harris |
| 2020/0003331 A1 | 1/2020 | Beck |
| 2020/0278190 A1 | 9/2020 | Bertini et al. |
| 2021/0254641 A1 * | 8/2021 | Schmidt ................ F16K 31/06 |

FOREIGN PATENT DOCUMENTS

| | | |
|---|---|---|
| JP | 2016142646 A | 8/2016 |
| WO | 2014012608 A1 | 1/2014 |

\* cited by examiner

Fig. 3a
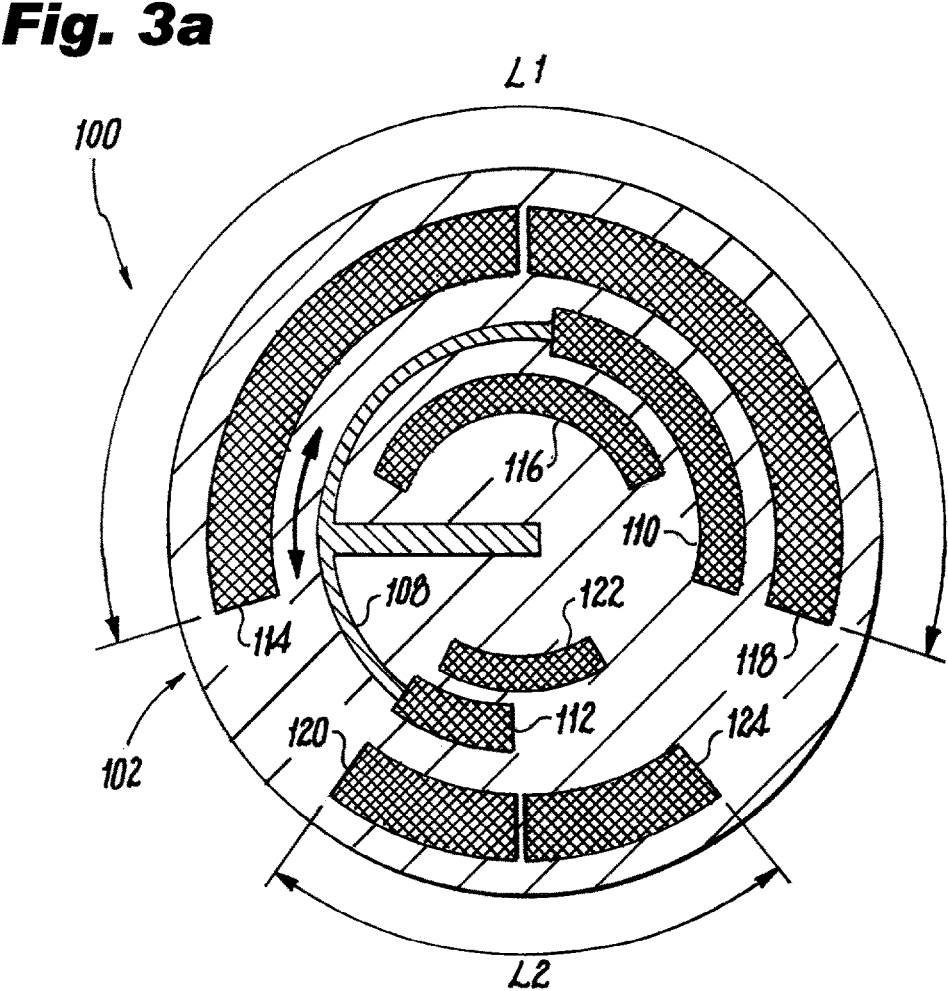
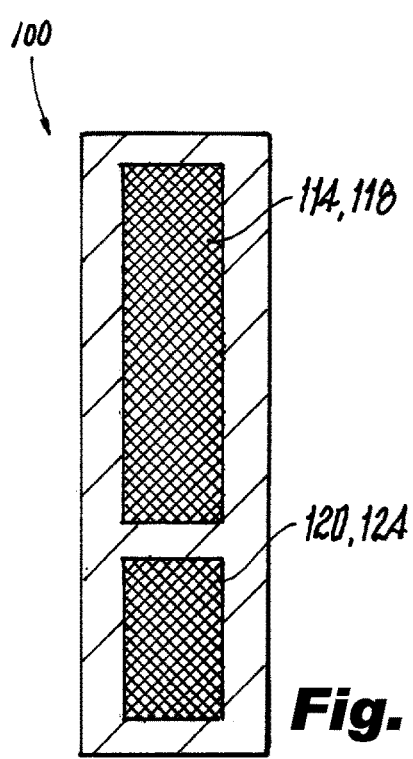
Fig. 3b
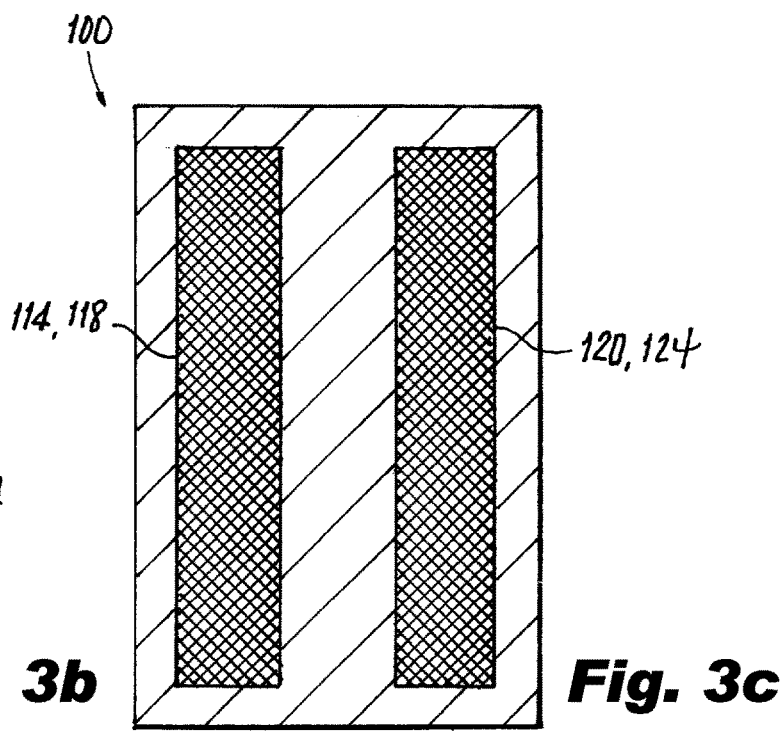
Fig. 3c

DUAL RANGE POSITION SENSING CONFIGURATIONS FOR VARIABLE DIFFERENTIAL TRANSFORMERS

BACKGROUND

1. Field

The present disclosure relates to position sensing devices such as used for position feedback control in valves and the like.

2. Description of Related Art

Position sensing devices such as Linear/Rotary Variable Differential Transformers (LVDTs and RVDTs) have an uncertainty typically driven by the overall operating range. In high accuracy applications this can often drive design tolerances and limit the available range of operation to meet an overall accuracy requirement.

The conventional techniques have been considered satisfactory for their intended purpose. However, there is an ongoing need for improved systems and methods for position measuring. This disclosure provides a solution for this need.

SUMMARY

An assembly includes a housing. A first set of coils is mounted to the housing. The first set of coils extends in an axial or circumferential direction along the housing for a first length. A second set of coils is mounted to the housing. The second set of coils extends in the axial or circumferential direction along the housing for a second length that is shorter than the first length. A core member includes a first core and a second core in series with one another in the axial or circumferential direction along the core member. The core member is moveable within the housing along a stroke. For at least a first portion of the stroke, the first core is within the first set of coils. For at least a second portion of the stroke, the second core is within the second set of coils.

The second set of coils and second core can be configured to provide greater spatial resolution for measurements of position of the core member than are the first set of coils and first core. The first core can be within the first set of coils for a greater portion of the first stroke than the second core is within the second set of coils. The first portion of the stroke and the second portion of the stroke can overlap in the axial direction. The second portion of the stroke can be entirely within the first portion of the stroke.

The first set of coils can be axially non-overlapping with the second set of coils. The first set of coils can be axially spaced apart from the second set of coils. The first set of coils can be coaxial with the second set of coils. The first set of coils can overlap with the second set of coils in a radial direction relative to the axial direction. The first set of coils can include, in this axial order, a first secondary coil, a primary coil, and a second secondary coil. The second set of coils can include, in this axial order, a first secondary coil, a primary coil, and a second secondary coil.

The first core can be axially spaced apart from the second core. The first core member can be coaxial with the second core. The first core can overlap with the second core in a radial direction relative to the axial direction.

The housing can be a valve housing defining an inlet and an outlet. The core member can include a valve piston having a metering passage defined therein. The metering passage can connect the inlet in fluid communication with the outlet. Movement of the valve piston along the stroke can change the effective flow area through the metering passage to control flow from the inlet to the outlet. The first core can be on one side of the valve piston, and the second core can be on a second side of the valve piston opposite the first side in the axial direction. It is also contemplated that the first core can be on one side of the valve piston, and the second core can also be on the first side of the piston in the axial direction.

The housing and piston can be configured so the stroke is defined along a straight path. It is also contemplated that the housing and piston can be configured so the stroke is defined along a curved path.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIGS. 3a-3c are a schematic cross-sectional axial elevation view, and two side elevation views of another embodiment of the assembly of FIG. 1, showing a housing and core member configured to follow a curved stroke path.

DETAILED DESCRIPTION OF THE PREFERRED EMBODIMENTS

Figure 1:
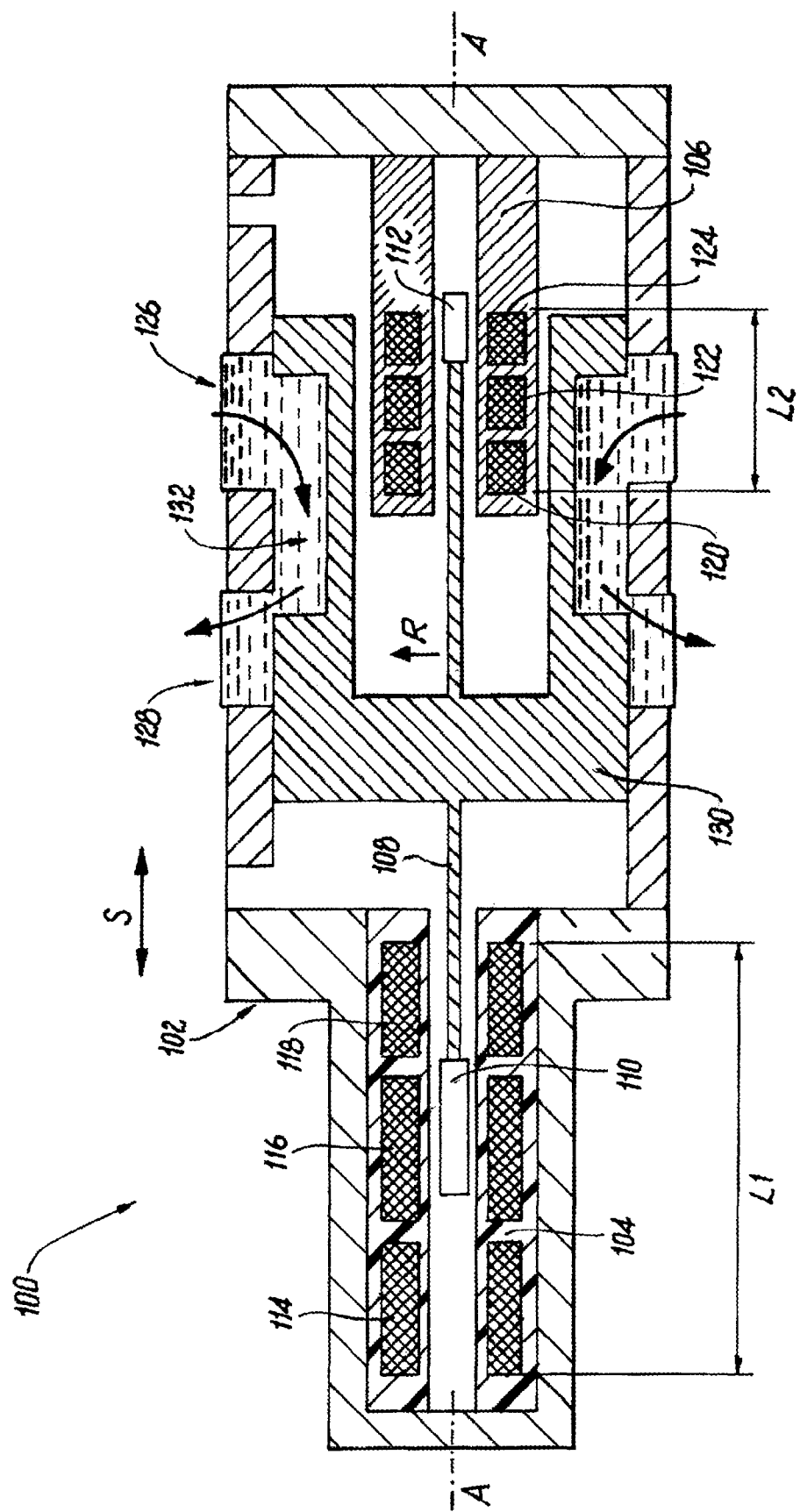
FIG. 1 is a schematic cross-sectional side elevation view of an embodiment of an assembly constructed in accordance with the present disclosure, showing the first and second sets of coils and respective first and second cores.

Reference will now be made to the drawings wherein like reference numerals identify similar structural features or aspects of the subject disclosure. For purposes of explanation and illustration, and not limitation, a partial view of an embodiment of an assembly in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to provide position sensing with both a large range of motion coverage as well as high accuracy relative to traditional configurations for Linear/Radial Variable Differential Transformers (LVDTs and RVDTs).

An assembly 100 includes a housing 102. A first set of coils 104 is mounted to the housing 102. The first set of coils 104 extends in an axial direction along the axis A of the housing 102 for a first length L1. A second set of coils 106 is mounted to the housing 102. The second set of coils 106 extends in the axial direction along the axis A of the housing 102 for a second length L2 that is shorter than the first length L1. A core member 108 includes a first core 110 and a second core 112 in series with one another in the axial direction relative to axis A along the core member 108. The core member 108 is moveable within the housing 102 along a stroke S indicated schematically in FIGS. 1-3 by the double pointed arrows.

For at least a first portion of the stroke, the first core 110 is within the first set of coils 104. It is contemplated that the first core 110 can be within the first set of coils 104 for the entire stroke S, so that the LVDT comprised of core 110 and the set of coils 104 can provide position data for the core member 108 for the entire stroke S.

For at least a second portion of the stroke S, the second core 112 is within the second set of coils 106. The LVDT comprised of the second set of coils 106 and second core 112 is configured to provide greater spatial resolution for measurements of position of the core member 108 than are the first set of coils 104 and first core 110. The first core 110 is within the first set of coils 104 for a greater portion (L1) of the first stroke S than the second core 112 is within the second set of coils 106 (L2). The first portion of the stroke S where the first LVDT is operative and the second portion of the stroke S where the second LVDT is operative overlap in the axial direction of axis A. The second portion of the stroke S (where the second core 112 is within the second set of coils 106) is entirely within the length of first portion of the stroke S where the first core 110 is within the first set of coils 104. However, it is also contemplated that the first and second portions of the stroke S can be only partially overlapping or non-overlapping as needed for a given application.

The first set of coils 104 is axially non-overlapping with the second set of coils 106. The first set of coils 104 is axially spaced apart from the second set of coils 106. The first set of coils 104 is coaxial about the axis A with the second set of coils 106. The first set of coils 104 overlaps with the second set of coils 106 in a radial direction R relative to the axial direction of axis A. The first set of coils 104 includes, in this axial order, a first secondary coil 114, a primary coil 116, and a second secondary coil 118. The second set of coils 106 includes, in this axial order, a first secondary coil 120, a primary coil 122, and a second secondary coil 124.

The first core 110 is axially spaced apart along axis A from the second core 112. The first core 110 is coaxial on axis A with the second core 112. The first core 110 overlaps with the second core 110 in the radial direction R relative to the axial direction. The first core 110 is longer than is the second core 112 in the axial direction of axis A, although this does not have to be the case. The core length can be up to the design of a variable differential transformer (VDT) to obtain optimal accuracy across the desired portion of a stroke.

Figure 2:
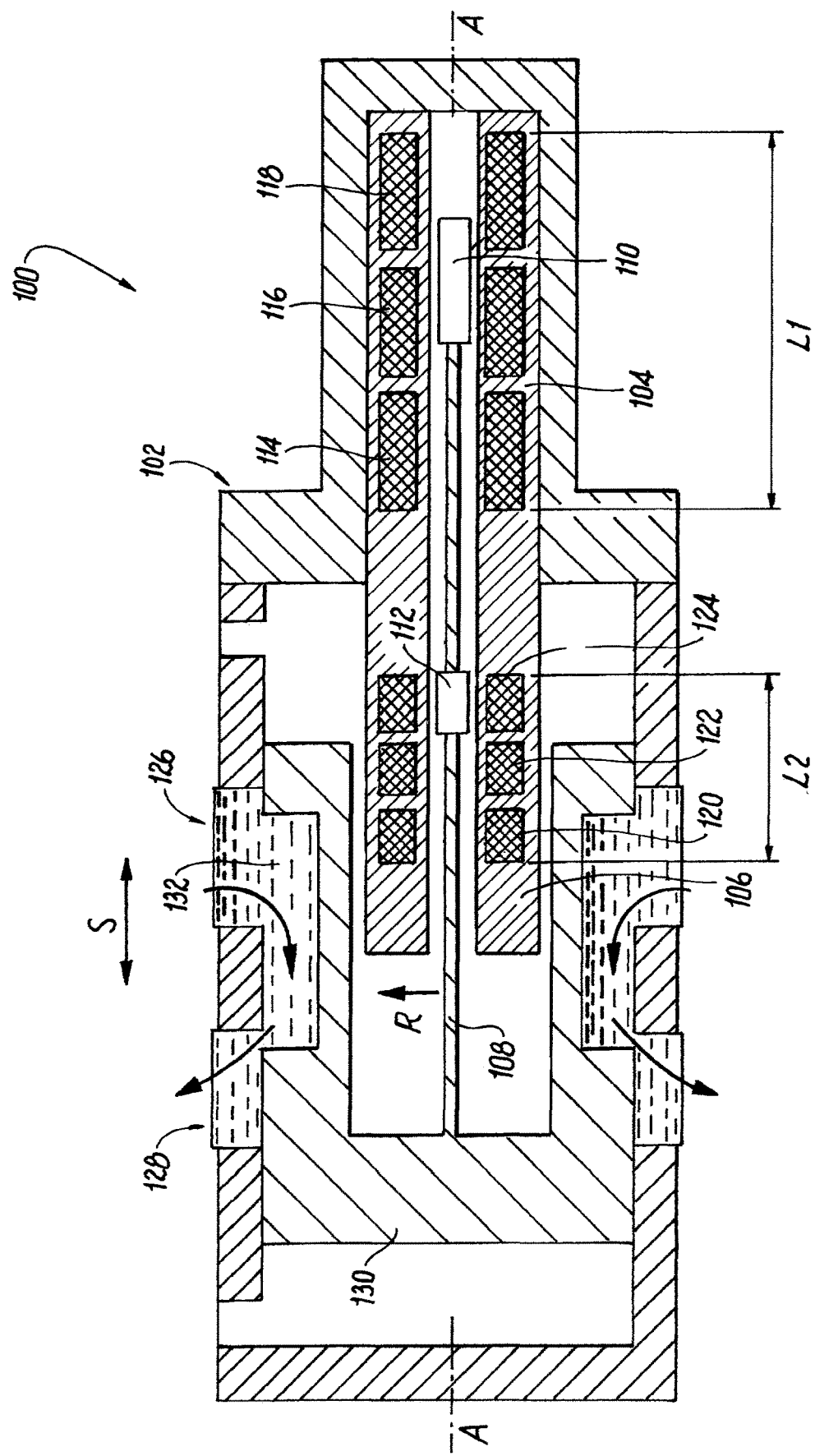
FIG. 2 is a schematic cross-sectional side elevation view of another embodiment of the assembly of FIG. 1, wherein the cores and sets of coils are all on the same side of the piston.

With continued reference to FIG. 1, the housing 102 is a valve housing defining an inlet 126 and an outlet 128. The core member 108 includes a valve piston 130 having a metering passage 132 defined therein. The metering passage 132 connects the inlet 126 in fluid communication with the outlet 128, at least for a portion of the stroke S. Movement of the valve piston 130 along the stroke S changes effective flow area through the metering passage to control flow from the inlet 126 to the outlet 128, where the flow is indicated schematically in FIGS. 1-3 by the curved flow arrows. In FIG. 1, the first core 110 is on one side of the valve piston 132, i.e. the left side as oriented in FIG. 1. The second core 112 is on a second side, i.e. the right side as oriented in FIG. 1, of the valve piston 132 opposite the first side in the axial direction along the axis A. With reference to FIG. 2, like reference numerals indicate like components as described herein with reference to FIG. 1. In FIG. 2, the first core 110 and the second core 112 are both on the same side of the valve piston 132, i.e. the right side as oriented in FIG. 2, in the axial direction of axis A.

While shown and described herein in the context of a valve, those skilled in the art will readily appreciate that systems and methods as disclosed herein can be used in actuators, or any other suitable device that uses position feedback. This can include devises that use linear position feedback and those that use position feedback rotationally.

With reference now to FIG. 3a, like reference numerals indicate like components as described above with respect to FIG. 1. Whereas in FIGS. 1 and 2 the stroke S is defined along a straight line for liner LVDT position sensing, in FIG. 3 the housing 102 and core member 108 (which in this case is a rotational linkage) and its piston 132 are configured so the stroke S is defined along a curved path. This can allow for LVDT/RVDT position sensing along an arcuate path and/or angular position (rotational) sensing. As shown in FIGS. 3b and 3c, which are side elevation views relative to the axial view of FIG. 3a, the coil sets 114/118 and 120/124 can all be on the same axial level as in FIG. 3b, or multiple axial levels can be used for the different coil sets 114/118 versus 120/124 as in FIG. 3c.

Figure 4:
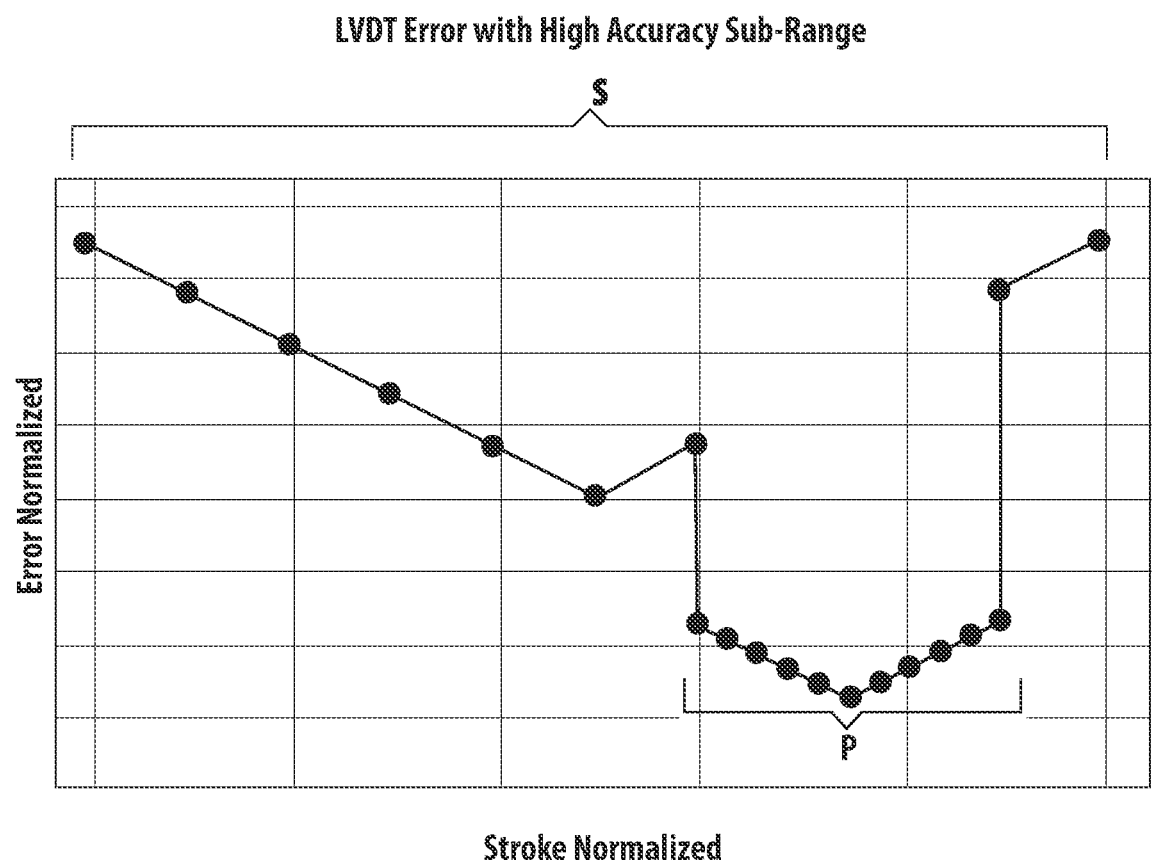
FIG. 4 is a graph showing positional accuracy along the stroke of the assembly of FIG. 1, including potential accuracy benefits in a subrange of the full stroke.

With reference now to FIG. 4, a graph is shown with normalized error on the vertical axis and position of the stoke S of FIGS. 1-3 along the horizontal axis. The points of the graph show that along the stroke S, the LVDT/RVDT allows for position sensing, but where there is a heighted accuracy (lower error) in the second portion P of stroke S where the second core 112 is within the second set of coils 106 as numbered in FIGS. 1-3. Designers can tune their designs to target the second portion P of the stroke S to be located in a portion of their design where it is beneficial to target higher accuracy. For example, the more sensitive portion of a valve stroke could be positioned in a design to coincide with the second portion P of the stroke S. This allows for measurements along the entire stroke S, but with the added benefit of extra accuracy in the more important portion P of the stroke S.

Systems and methods as disclosed herein can provide potential advantages including the following potential advantages. There can be a relaxation of limits on design tolerances is areas of high accuracy due to the targeted accuracy of the second portion P of the stroke S. This may also be utilized to obtain multiple points of increased accuracy across the full range of operation, e.g. multiple second sets of coils 106 and the corresponding cores 112 in a single assembly 100. There is a potential to reduce error due to thermal growth by limiting the length of certain elements in the LVDT/RVDT. There is also a potential for additional error checking, e.g. on an engine with position cross-reference between the two or more LVDT/RVDT outputs.

The methods and systems of the present disclosure, as described above and shown in the drawings, provide for position sensing with both large operating range and high accuracy relative to traditional configurations. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An assembly comprising:
   a housing;

a first set of coils mounted to the housing, wherein the first set of coils extends in a first direction along the housing for a first length;

a second set of coils mounted to the housing, wherein the second set of coils extends in the first direction along the housing for a second length that is shorter than the first length; and a core member including a first core and a second core in series with one another in the first direction along the core member, wherein the core member is moveable within the housing along a stroke, wherein the first core and the second core are mounted stationary with respect to one another and with respect to the core member, and wherein the first core and the second core are mounted to the core member for movement together with the core member relative to the housing, wherein for at least a first portion of the stroke, the first core is within the first set of coils, and wherein for at least a second portion of the stroke, the second core is within the second set of coils, wherein the second set of coils and second core are configured to provide greater spatial resolution for measurements of position of the core member than are the first set of coils and first core.

2. The assembly as recited in claim 1, wherein the first set of coils is non-overlapping with the second set of coils in the first direction.

3. The assembly as recited in claim 2, wherein the first set of coils is spaced apart from the second set of coils in the first direction.

4. The assembly as recited in claim 1, wherein the first set of coils is coaxial with the second set of coils.

5. The assembly as recited in claim 4, wherein the first set of coils overlaps with the second set of coils in a radial direction relative to the first direction.

6. The assembly as recited in claim 1, wherein the first set of coils includes, in this axial order, a first secondary coil, a primary coil, and a second secondary coil.

7. The assembly as recited in claim 1, wherein the second set of coils includes, in this axial order, a first secondary coil, a primary coil, and a second secondary coil.

8. The assembly as recited in claim 1, wherein the first core is axially spaced apart from the second core.

9. The assembly as recited in claim 1, wherein the first core is coaxial with the second core.

10. The assembly as recited in claim 9, wherein the first core overlaps with the second core in a radial direction relative to the first direction, wherein the first direction is axial.

11. The assembly as recited in claim 1, wherein the housing is a valve housing defining an inlet and an outlet.

12. The assembly as recited in claim 11, wherein the core member includes a valve piston having a metering passage defined therein, wherein the metering passage connects the inlet in fluid communication with the outlet, and wherein movement of the valve piston along the stroke changes effective flow area through the metering passage to control flow from the inlet to the outlet.

13. The assembly as recited in claim 12, wherein the first core is on one side of the valve piston, and wherein the second core is on a second side of the valve piston opposite a first side in the axial direction.

14. The assembly as recited in claim 12, wherein the first core is on one side of the valve piston, and wherein the second core is also on a first side of the valve piston in the axial direction.

15. The assembly as recited in claim 1, wherein the housing and piston are configured so the stroke is defined along a straight path.

16. The assembly as recited in claim 1, wherein the housing and piston are configured so the stroke is defined along a curved path.

17. The assembly as recited in claim 1, wherein the first core is within the first set of coils for a greater portion of the first stroke than the second core is within the second set of coils.

18. The assembly as recited in claim 1, wherein the first portion of the stroke and the second portion of the stroke overlap in the axial direction.

19. The assembly as recited in claim 18, wherein the second portion of the stroke is entirely within the first portion of the stroke.

* * * * *